United States Patent
Lucas et al.

(10) Patent No.: US 9,878,772 B2
(45) Date of Patent: Jan. 30, 2018

(54) MOUNTING ASSEMBLY AND METHOD FOR MOUNTING A SOUND-DEADENING BODY TO A FUSELAGE OF AN AIRCRAFT

(75) Inventors: Michael Eugene Lucas, Bluffton, SC (US); Nicholas W. Yovich, McKinney, TX (US)

(73) Assignee: Gulfstream Aerospace Corporation, Savannah, GA (US)

( * ) Notice: Subject to any disclaimer, the term of this patent is extended or adjusted under 35 U.S.C. 154(b) by 419 days.

(21) Appl. No.: 13/347,454

(22) Filed: Jan. 10, 2012

(65) Prior Publication Data

US 2013/0175395 A1 Jul. 11, 2013

(51) Int. Cl.
*B64C 1/40* (2006.01)

(52) U.S. Cl.
CPC .............. *B64C 1/403* (2013.01); *B64C 1/40* (2013.01); *Y10T 29/4978* (2015.01)

(58) Field of Classification Search
CPC ........ B64C 1/403; B64C 1/40; Y10T 29/4978
USPC ............... 248/560, 562, 612, 636, 635, 632; 24/293, 458, 453; 411/508, 482, 485, 411/401, 455, 451.3; 403/252, 253, 254
See application file for complete search history.

(56) References Cited

U.S. PATENT DOCUMENTS

| | | | | |
|---|---|---|---|---|
| 1,817,653 A | * | 8/1931 | Thaden | 52/464 |
| 3,238,835 A | * | 3/1966 | Rosenberg | 411/338 |
| 3,756,551 A | * | 9/1973 | Bishop | 267/141.1 |
| 4,286,642 A | * | 9/1981 | Keatley | 411/112 |
| 4,629,154 A | * | 12/1986 | Kataczynski | 248/610 |
| 4,984,971 A | * | 1/1991 | Bergeron | 417/363 |
| 5,011,354 A | * | 4/1991 | Brownlee | 411/439 |
| 5,110,081 A | * | 5/1992 | Lang, Jr. | 248/635 |
| 5,170,985 A | * | 12/1992 | Killworth et al. | 248/635 |
| 5,222,694 A | * | 6/1993 | Smoot | 244/119 |
| 5,263,665 A | * | 11/1993 | Konecheny et al. | 244/117 R |
| 5,316,423 A | * | 5/1994 | Kin | 411/510 |
| 5,335,893 A | * | 8/1994 | Opp | 248/635 |
| 5,409,283 A | * | 4/1995 | Ban | 296/35.1 |
| 5,533,237 A | | 7/1996 | Higgins | |

(Continued)

FOREIGN PATENT DOCUMENTS

GB          1049510          11/1966

OTHER PUBLICATIONS

PCT Search Report and Written Opinion dated Mar. 26, 2013 in PCT Application No. PCT/US13/20928.

(Continued)

*Primary Examiner* — Nkeisha Smith
(74) *Attorney, Agent, or Firm* — LKGlobal | Lorenz & Kopf, LLP

(57) ABSTRACT

A mounting assembly for mounting a sound-deadening body to a fuselage of an aircraft and a method for attaching a sound-deadening body to a fuselage of an aircraft using the mounting assembly is disclosed herein. In a non-limiting embodiment, the mounting assembly includes, but is not limited to, a retaining member that is configured to engage the sound-deadening body. The mounting assembly further includes an isolating member that is engaged with the retaining member. The isolating member is configured for connection to the fuselage and is further configured to diminish transmission of vibration from the fuselage to and through the retaining member, and therefore to reduce the transmission of sound into the cabin.

16 Claims, 10 Drawing Sheets

(56) References Cited

U.S. PATENT DOCUMENTS

| | | | |
|---|---|---|---|
| 5,580,028 A * | 12/1996 | Tomczak et al. | 248/634 |
| 5,624,099 A * | 4/1997 | Spies et al. | 248/562 |
| 5,799,923 A * | 9/1998 | Carr et al. | 248/635 |
| 5,876,023 A * | 3/1999 | Hain et al. | 267/141.4 |
| 5,876,024 A * | 3/1999 | Hain | 267/141.4 |
| 6,039,523 A * | 3/2000 | Kraus | 411/48 |
| 6,116,836 A * | 9/2000 | Long, Sr. | 411/451.1 |
| 6,149,183 A * | 11/2000 | Ford | 280/728.2 |
| 6,158,690 A | 12/2000 | Wadey et al. | |
| 6,287,043 B1 * | 9/2001 | Kraus | 403/297 |
| 6,328,293 B1 * | 12/2001 | Olsen | 267/140.11 |
| 6,412,163 B1 * | 7/2002 | Russell | 29/453 |
| 6,471,179 B1 * | 10/2002 | Tousi et al. | 248/635 |
| 6,496,372 B1 * | 12/2002 | Davison et al. | 361/704 |
| 7,000,585 B2 | 2/2006 | Clemons et al. | 123/195 C |
| 7,017,239 B2 * | 3/2006 | Kurily et al. | 24/297 |
| 7,070,157 B2 * | 7/2006 | Huprikar et al. | 248/636 |
| 7,116,556 B2 * | 10/2006 | Lee et al. | 361/704 |
| 7,163,200 B2 * | 1/2007 | Dickson et al. | 267/141.4 |
| 7,261,365 B2 * | 8/2007 | Dickson et al. | 296/190.07 |
| 7,635,106 B2 | 12/2009 | Pham et al. | |
| 7,866,928 B2 * | 1/2011 | Schmitz | 411/34 |
| 8,056,880 B2 * | 11/2011 | Tsuchida | 248/638 |
| 8,132,640 B2 * | 3/2012 | Heitkamp et al. | 180/379 |
| 8,235,350 B2 * | 8/2012 | Tetsuda et al. | 248/560 |
| 8,474,804 B2 * | 7/2013 | Masterson et al. | 267/141 |
| 8,584,325 B2 * | 11/2013 | Onuma | 24/297 |
| 8,677,573 B2 * | 3/2014 | Lee | 24/297 |
| 2003/0185652 A1 * | 10/2003 | Wu | 411/508 |
| 2004/0244158 A1 * | 12/2004 | Awakura et al. | 24/458 |
| 2005/0067548 A1 * | 3/2005 | Inoue | 248/635 |
| 2006/0219860 A1 * | 10/2006 | Greenwood | 248/560 |
| 2008/0283718 A1 * | 11/2008 | Tsuge | 248/562 |
| 2009/0151136 A1 * | 6/2009 | Ramsauer | 24/458 |
| 2009/0189051 A1 * | 7/2009 | Love | 248/635 |
| 2009/0249587 A1 * | 10/2009 | Donahue-Yan et al. | 24/297 |
| 2009/0302189 A1 * | 12/2009 | Tetsuda et al. | 248/560 |
| 2012/0317757 A1 * | 12/2012 | Risdale et al. | 24/458 |
| 2013/0031752 A1 * | 2/2013 | Davies | 24/453 |
| 2013/0133504 A1 * | 5/2013 | Takegawa | 84/421 |
| 2013/0255065 A1 * | 10/2013 | Bachelder et al. | 29/525.01 |
| 2014/0003884 A1 * | 1/2014 | Diep et al. | 411/508 |
| 2014/0086704 A1 * | 3/2014 | Hemingway et al. | 411/392 |

OTHER PUBLICATIONS

The International Bureau of WIPO, International Preliminary Report on Patentability for International Application No. PCT/US2013/020928, dated Jul. 24, 2014.

European Patent Office, Extended European Search Report for European Patent Application No. 13735929.5 -1754, dated Dec. 18, 2015.

* cited by examiner

MOUNTING ASSEMBLY AND METHOD FOR MOUNTING A SOUND-DEADENING BODY TO A FUSELAGE OF AN AIRCRAFT

TECHNICAL FIELD

The present invention generally relates to aircraft and more particularly relates to a mounting assembly and a method for mounting a sound-deadening body to a fuselage of an aircraft.

BACKGROUND

The outer skin of the fuselage of an aircraft directly interacts with the atmosphere while the aircraft is flying. This interaction with the atmosphere causes vibrations to radiate throughout the fuselage. These vibrations generate noise that, if unimpeded, would radiate into the cabin of the aircraft and be perceptible to passengers. Because this is undesirable, modern passenger aircraft commonly include a sound-deadening blanket that is positioned between the fuselage of the aircraft and the cabin of the aircraft.

Conventional sound-deadening blankets are attached to the fuselage via retaining spikes. The retaining spikes are mounted directly to any suitable portion of the fuselage, including, but not limited to, the skin and the frame elements of the fuselage. The retaining spikes have elongate cylindrically shaped bodies that penetrate through the sound-deadening blankets to engage both sides of the sound-deadening blanket. In this manner, the retaining spikes are enabled to hold the sound-deadening blankets in place with respect to the fuselage.

While the above described solution system is adequate, there is room for improvement. The retaining spikes are commonly manufactured from relatively hard materials including, but not limited to, metals and plastics. Metals and hard plastics are relatively good transmitters of vibration and sound. Being mounted directly to the fuselage places the retaining spikes in direct contact with the very structure that vibrates and causes the undesired noise. Because the retaining spikes are good transmitters of sound and vibration, because they are directly attached to the structure that generates the undesired noise and vibration, and because the retaining spikes pass through the sound-deadening blanket, the noise and vibration that is generated by the fuselage has a pathway that can effectively bypass the sound-deadening blanket. This bypass can occur in several ways. For example, noise may radiate off of the tip of the retaining spike which is located on the cabin side of the sound-deadening body. Noise may also radiate off of the sound-deadening body that is located near the spike because the spike imparts vibration into the sound-deadening body. Additionally, if the retaining spike is in physical contact with the panels of the cabin, vibrations from the fuselage can pass through the retaining spike directly into the cabin panels which, in turn, radiate noise into the cabin. Also, noise on the fuselage side of the sound-deadening blankets can pass directly through the hole in the sound-deadening blanket if the hole is not snug around the spike. Accordingly, the current arrangement of retaining spikes and sound-deadening blankets in aircraft fuselages increases the likelihood that some amount of undesired noise and vibration from the fuselage will be transmitted into the passenger compartment.

Accordingly, it is desirable to provide a mounting assembly that diminishes the likelihood that noise and vibration generated by the interaction of the fuselage with the atmosphere will enter the passenger cabin of the aircraft. In addition, it is desirable to provide a method attaching a sound-deadening body to the fuselage of an aircraft that diminishes the likelihood that sound will travel from the fuselage into the passenger cabin. Furthermore, other desirable features and characteristics will become apparent from the subsequent detailed description and the appended claims, taken in conjunction with the accompanying drawings and the foregoing technical field and background.

BRIEF SUMMARY

Embodiments of a mounting assembly for mounting a sound-deadening body to a fuselage of an aircraft and embodiments of a method for attaching a sound-deadening body to a fuselage of an aircraft using the mounting assembly are disclosed herein.

In a first non-limiting embodiment, the mounting assembly includes, but is not limited to, a retaining member that is configured to engage the sound-deadening body. The mounting assembly further includes an isolating member that is engaged with the retaining member. The isolating member is configured for connection to the fuselage and is further configured to diminish transmission of vibration from the fuselage to the retaining member.

In a second non-limiting embodiment, the mounting assembly includes, but is not limited to a mounting bracket that is configured for attachment to the fuselage. The mounting assembly further includes an isolating grommet that is engaged with the mounting bracket. The mounting assembly still further includes a retaining spike that is engaged with the isolating grommet The retaining spike is configured to engage the sound-deadening body. The isolating grommet supports the retaining spike on the mounting bracket and is configured to diminish transmission of vibration from the fuselage to the retaining spike. The retaining spike has no direct contact with the mounting bracket.

In a third non-limiting embodiment, the method includes, but is not limited to affixing a mounting assembly to the fuselage of the aircraft. The mounting assembly has a mounting bracket, an isolating grommet that is engaged with the mounting bracket, and a retaining spike that is engaged with the isolating grommet The retaining spike includes a detachable alignment spike portion. The method further includes positioning the sound-deadening body over the retaining spike. The method further includes detecting the alignment spike through the sound-deadening body. The method further includes creating an opening in the sound-deadening body proximate the alignment spike. The method further includes pressing the sound-deadening body onto the retaining spike. The method further includes detaching the alignment spike from the retaining spike. The method still further includes engaging the retaining spike with a retaining plate to retain the sound-deadening body on the retaining spike.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Embodiments of an improved mounting assembly and embodiments of a method for mounting a sound-deadening body to a fuselage of an aircraft are disclosed herein. The mounting assembly includes a mounting bracket that is configured to be attached to a structural element and/or the skin of the fuselage of an aircraft. The mounting bracket further includes an opening to facilitate the attachment of other components of the mounting assembly to the mounting bracket. The mounting assembly further includes a grommet that is configured to engage the mounting bracket so as to be received within, and retained within, the opening of the mounting bracket. The grommet is further configured to absorb, mitigate, and/or otherwise diminish the transmission of noise and/or vibrations that originate from the fuselage and that are transmitted through the mounting bracket to the grommet. In some embodiments, the grommet may comprise an elastomeric material. The mounting assembly also includes a retaining spike that is engaged with the grommet and that is further configured to engage and retain the sound-deadening body. By engaging the grommet and by having no direct physical contact with the mounting bracket, the retaining spike may be secured to the vibration/noise-generating fuselage yet remain substantially vibrationally isolated/insulated from the fuselage. Thus, the retaining spike can provide robust support for the sound-deadening body without being a transmitter of undesired noise and vibration through the sound deadening body. The retaining spike is configured to protrude through the sound deadening body and a retaining plate may engage the protruding portion of the retaining spike. The retaining spike and the retaining plate cooperate to retain and support the sound deadening body on the fuselage of the aircraft.

A greater understanding of the mounting assembly and of the method for mounting a sound-deadening body to the fuselage of an aircraft may be obtained through a review of the illustrations accompanying this application together with a review of the detailed description that follows.

Figure 1:
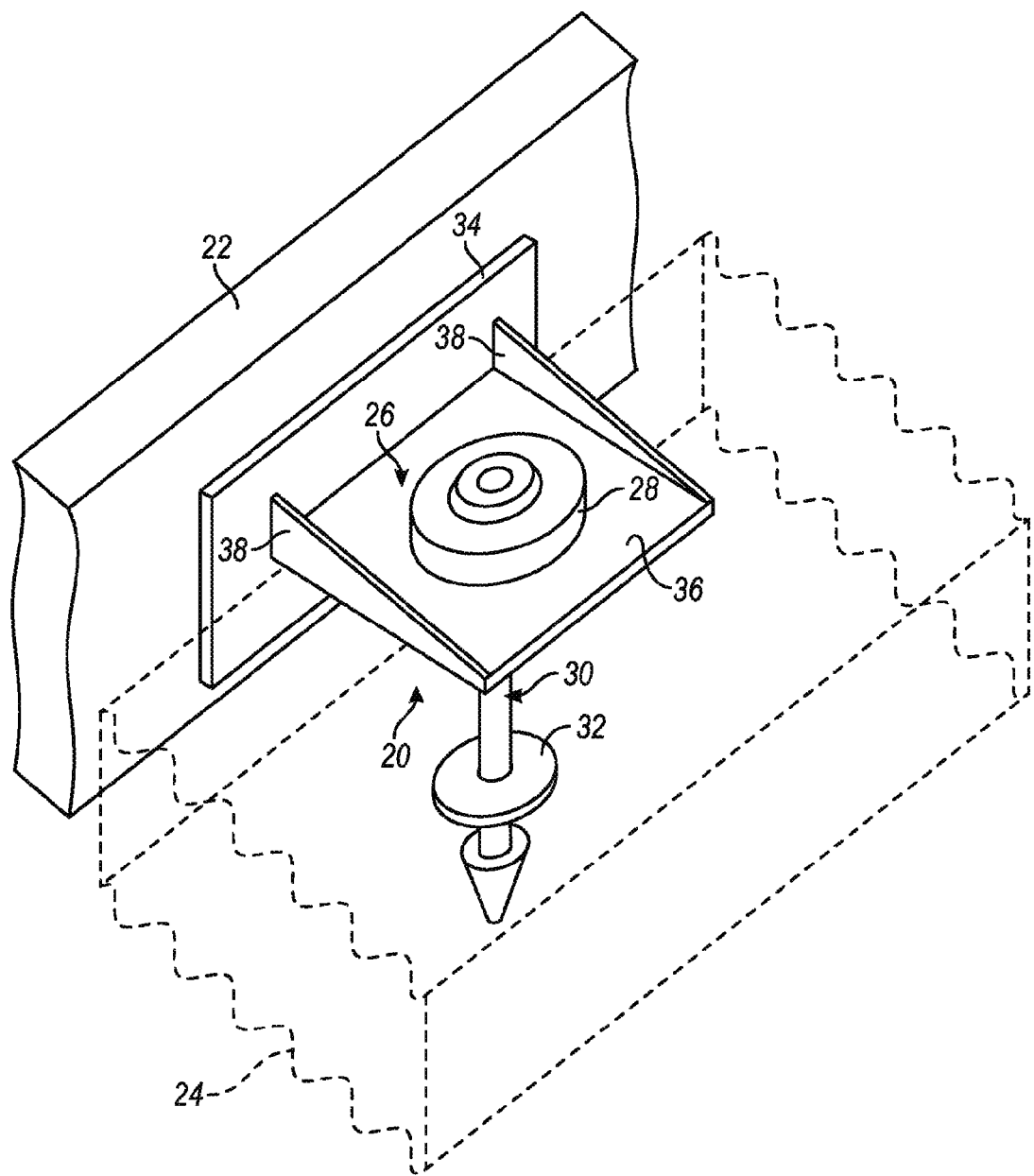
FIG. 1 is a perspective view illustrating an embodiment of a mounting assembly for mounting a sound-deadening body to a fuselage of an aircraft made in accordance with the teachings of the present disclosure.

FIG. 1 is perspective view illustrating an embodiment of a mounting assembly 20 made in accordance with the teachings of the present disclosure. Mounting assembly 20 is affixed to a frame element 22 which, together with other frame elements and an outer skin (not shown) forms a fuselage of an aircraft. Although mounting assembly 20 has been illustrated in FIG. 1 is being attached to a frame element, it should be understood that in other embodiments, mounting assembly 20 may be attached to any other portion of the fuselage of an aircraft including, but not limited to, an inner surface of the outer skin of the fuselage. As illustrated in FIG. 1, mounting assembly 20 is engaged with, and supports a sound-deadening body 24, illustrated in phantom lines. Sound-deadening body 24 may be any suitable sound-deadening body including any conventional aviation grade sound-deadening blanket. Such aviation grade sound-deadening blankets commonly include mass barriers to block sound or sound absorbing materials to absorb sound, or a combination of the two.

The mounting assembly 20 illustrated in FIG. 1 includes a mounting bracket 26, a grommet 28, a retaining spike 30, and a retaining plate 32. As will be discussed below, retaining spike 30 also includes a detachable alignment spike which is configured to facilitate the assembly of sound-deadening body 24 to mounting assembly 20 and which is detached during assembly of sound deadening body 24 to mounting assembly 20.

Mounting bracket 26 is configured for attachment to frame element 22. In the illustrated example, mounting bracket 26 includes a rear planar portion 34 which provides a substantially flat planar surface for engagement with a correspondingly flat planar surface of frame element 22. Rear planar portion 34 may be fixed to frame element 22 in any suitable manner including, but not limited to, double-sided tape, adhesive, epoxy, mechanical fasteners, welds, or via any other means effective to form a robust attachment of mounting bracket 26 to frame element 22. Mounting bracket 26 includes a platform 36 which includes an opening (not shown in FIG. 1) for receiving and retaining grommet 28. Mounting bracket 26 further includes a pair of support struts 38 which are attached to both rear planar portion 34 and to platform 36 and which provide structural support that assists platform 36 to support the weight of the other components of mounting assembly 20 as well as the weight of sound-deadening body 24. In other embodiments, mounting bracket 26 may have any other configuration that is suitable for supporting the other components of mounting assembly 20 and sound-deadening body 24.

In some embodiments, mounting bracket 26 may comprise an integral structure comprising a single part while in other embodiments, mounting bracket 26 may be constructed from separate elements. Mounting bracket 26 may be constructed from any suitable material including, but not limited to, any suitable plastic material, any suitable polymeric material, any suitable metal, or any other material effective to robustly support mounting assembly 20 and sound-deadening body 24 to frame element 22.

Figure 2:
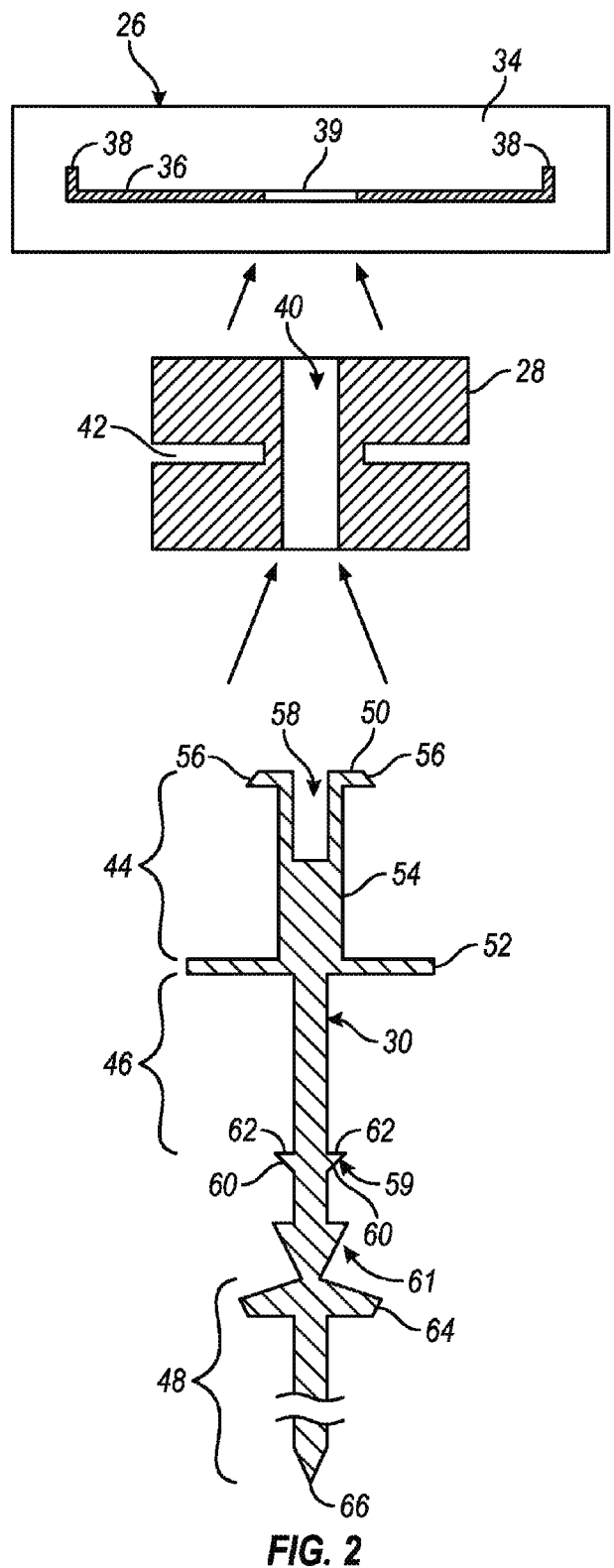
FIG. 2 is a schematic exploded cross-sectional view illustrating several of the components of the mounting assembly of FIG. 1 prior to assembly.

FIG. 2 is a schematic cross-sectional exploded view that depicts mounting bracket 26, grommet 28, and retaining spike 30 prior to assembly with respect to one another. In this view, the opening in platform 36 that was described above can be seen (hereinafter, "opening 39").

Grommet 28 is a generally cylindrically shaped elastomeric body having a circular periphery and a generally circular shaft (hereinafter, "shaft 40") extending axially through grommet 28. Grommet 28 could be non-cylindrically shaped in other embodiments. The peripheral surface of grommet 28 is configured to engage with mounting bracket 26 and shaft 40 is configured to engage retaining spike 30.

The peripheral surface of grommet 28 is configured to fit within opening 39 and to engage platform 36. To do so, grommet 28 includes a channel 42 that is defined in a peripheral surface of grommet 28. Channel 42 extends about the entire circumference of grommet 28 and is configured to engage with an upper and a lower surface of platform 36. Grommet 28, being comprised of an elastomeric material, may be compressed and squeezed through opening 39 and, while positioned within opening 39, may be maneuvered to cause the upper and lower surfaces of platform 36 to enter channel 42. In some embodiments, there may be an interference fit between grommet 28 and platform 36 to support grommet 28 in opening 39.

As stated above, shaft 40 extends axially through grommet 28 and has a generally circular cross section. In other embodiments, the cross section for shaft 40 need not be circular, but may have any suitable configuration. In some embodiments, the cross-sectional configuration of shaft 40 may conform to a geometric configuration of a portion of retaining spike 30.

As illustrated in FIG. 2, retaining spike 30 includes several different portions, each serving a specific function. Retaining spike 30 includes a grommet-engaging portion 44, a sound-deadening-body-engaging portion 46, and an alignment spike 48.

Grommet-engaging portion 44 is axially bounded by flange 50 and a flange 52. Flange 50 and flange 52 are spaced apart in an axial direction of retaining spike 30 from one another by a distance that corresponds with an axial length of grommet 28. Retaining spike 30 is configured for axial insertion into shaft 40 and flanges 50 and 52 are configured to engage with opposite axial ends of grommet 28. When retaining spike 30 is inserted into shaft 40 and when flange 50 protrudes through an upper end of shaft 40, retaining spike 30 will be engaged with, and retained by grommet 28 as a result of interference between an underside of flange 50 and an upper surface of grommet 28. Retaining spike 30 will also be obstructed from further upward movement with respect to grommet 28 as a result of interference between an upper surface of flange 52 and a lower surface of grommet 28. A cylindrical central portion 54 disposed between flange 50 and flange 52 has a generally circular cross section having a diameter that is substantially equal to an inner diameter of shaft 40. This configuration permits snug engagement between sound-deadening-body-engaging portion 46 and the inner surface forming shaft 40. This, in turn, provides for robust support of retaining spike 30 by grommet 28.

To facilitate axial insertion of retaining spike 30 into shaft 40, flange 50 includes a beveled portion 56. Beveled portion 56 is beveled at an angle that facilitates axial insertion of retaining spike 30 into shaft 40 and which obstructs axial extraction of retaining spike 30 from shaft 40. To further facilitate insertion of retaining spike 30 into grommet 28, a cavity 58 is defined at an axial end of retaining spike 30. Cavity 58 permits compression of flange 50 during axial insertion through shaft 40. Once flange 50 protrudes through an upper end of shaft 40, flange 50 will decompress and thereby cause the undersurface of flange 50 to engage an upper surface of grommet 28 and obstruct extraction of retaining spike 30 from grommet 28.

Sound-deadening-body-engaging portion 46 is bounded at an upper end by flange 52 and at a lower end by barb 59. With continuing reference to FIG. 1, barb 59 is configured to engage retaining plate 32. Barb 59 includes a beveled surface 60 which will facilitate upward movement of retaining plate 32 when retaining plate 32 is pressed onto retaining spike 30, as discussed below. Barb 59 also includes a flat surface 62 that will oppose downward movement of retaining plate 32 once retaining plate 32 has been pressed onto retaining spike 30. In other embodiments retaining plate 32 may alternatively be retained on triangular barb 61 or on additional barbs that could be added to retaining spike 30.

Alignment spike 48 extends axially from a rear flange 64 to a pointed end 66. Pointed end 66 has relatively sharply angled beveled surfaces to provide a relatively pointy end to alignment spike 48. This relatively pointy end will facilitate the detection of alignment spike 48 when an assembly worker is feeling for alignment spike 48 from a blind-side of sound-deadening body 24.

Figure 3:
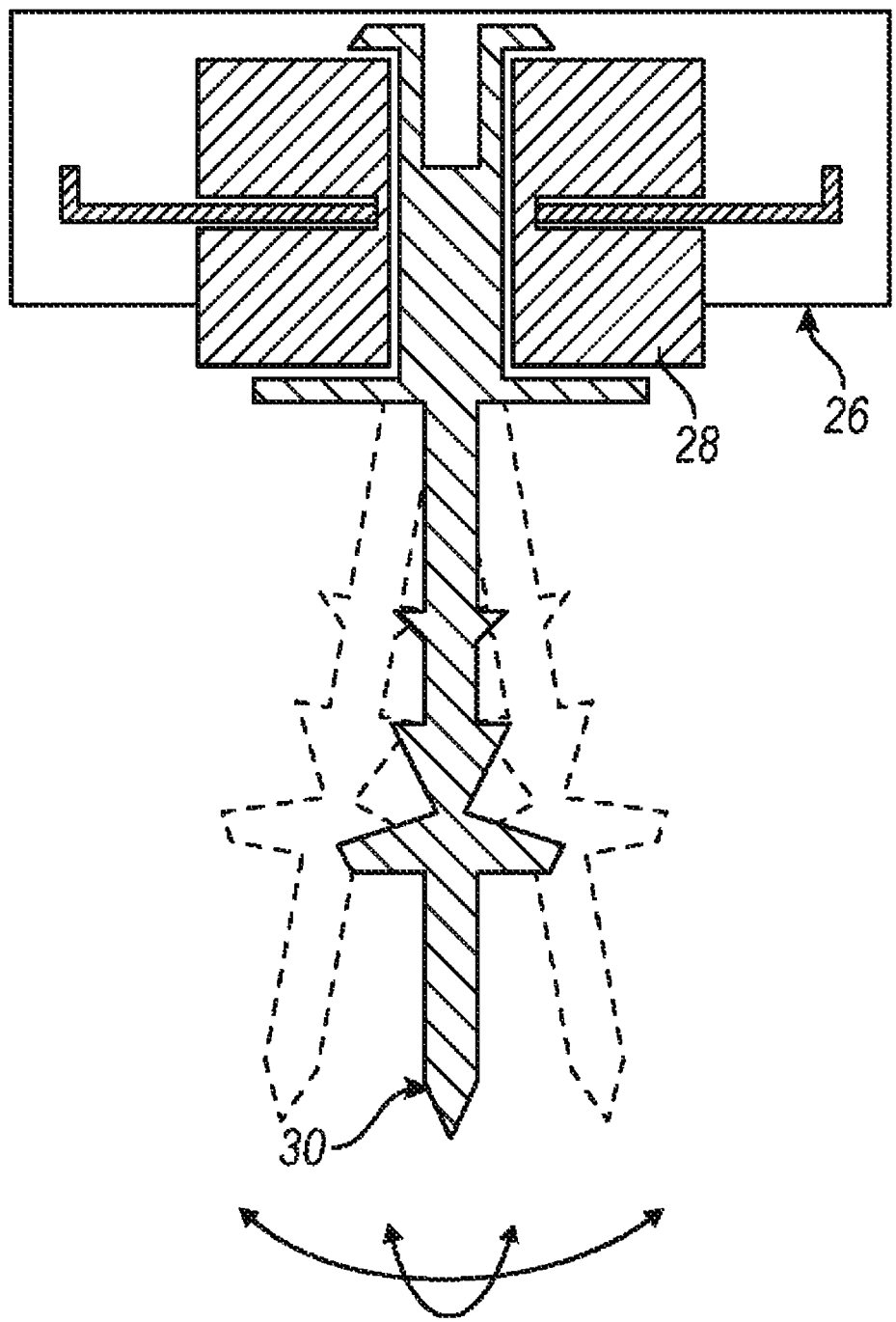
FIG. 3 is a schematic cross-sectional view illustrating the components of FIG. 2 after they have been assembled to one another to form a mounting sub-assembly.

FIG. 3 illustrates retaining spike 30, grommet 28, and mounting bracket 26 after these components have been assembled together. As illustrated, retaining spike 30 has no direct physical contact with mounting bracket 26. Rather, grommet 28 serves as an interface between retaining spike 30 and mounting bracket 26. Being constructed of an elastomeric material, grommet 28 is flexible and, consequently, permits some movement of retaining spike 30 while attached to mounting bracket 26 (as indicated by the canted silhouettes of retaining spike 30 shown in phantom lines). The elastomeric construct of grommet 28 also serves to dampen/absorb/mitigate the transmission of vibrations from mounting bracket 26 to retaining spike 30. Accordingly, any vibration that is encountered by mounting bracket 26 will first pass through grommet 28 before reaching retaining spike 30. Any such vibration will either be completely absorbed by, or substantially diminished by, grommet 28, thus substantially reducing the amount of sound and vibration transmitted by retaining spike 30.

Figure 4:
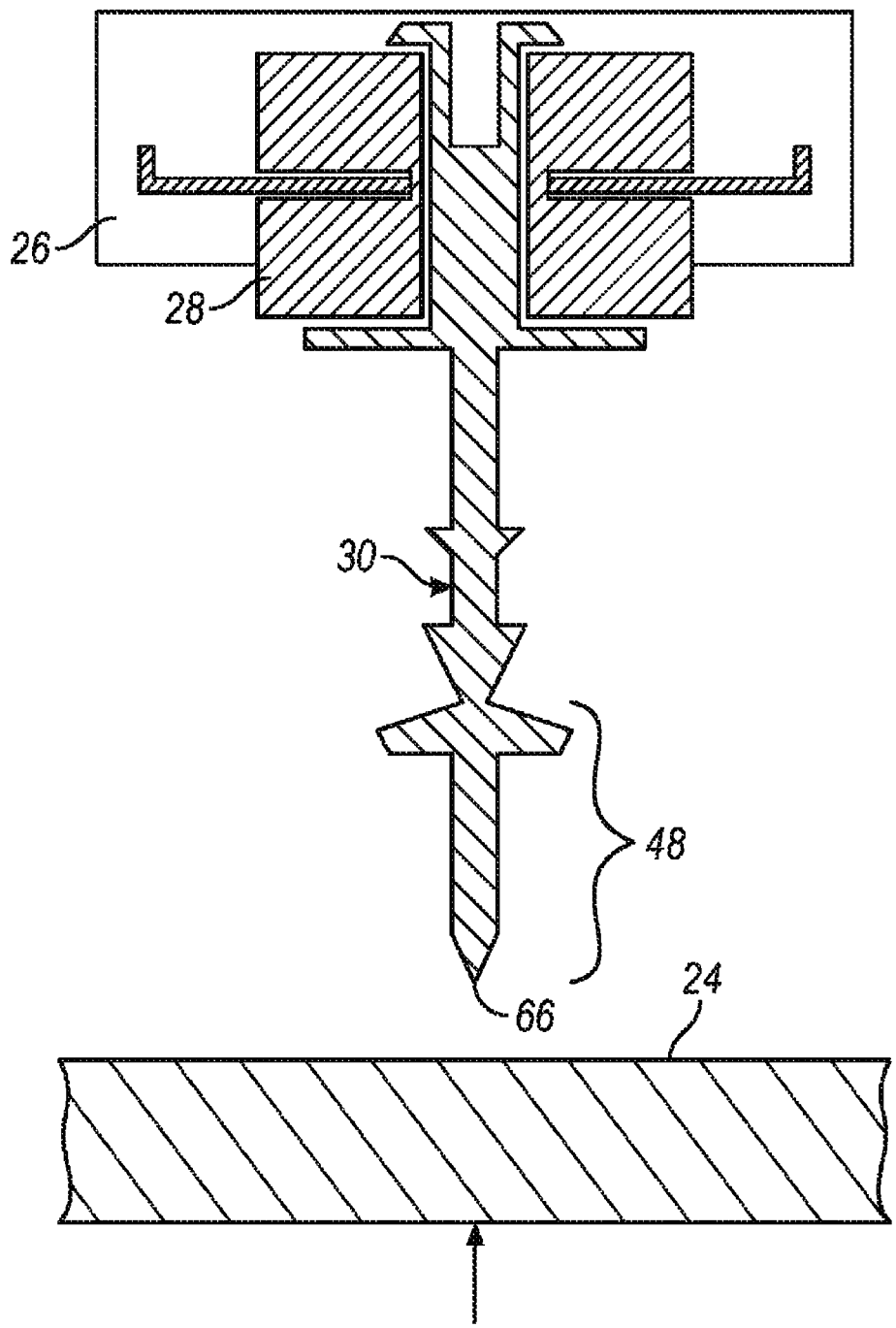
FIG. 4 is a schematic cross-sectional view illustrating the mounting sub-assembly of FIG. 3 together with a sound-deadening body.

FIG. 4 illustrates an initial stage of assembling sound-deadening body 24 to retaining spike 30. An assembly worker will press sound-deadening body 24 against retaining spike 30. Because alignment spike 48 extends from a longitudinal end of retaining spike 30, sound deadening body 24 will first encounter pointed end 66. Being constructed of relatively soft and flexible material, sound-deadening body 24 will deform where pointed end 66 contacts sound-deadening body 24. By applying his or her hand to the nearside of sound-deadening body 24 (the side of sound-deadening body 24 that faces away from retaining spike 30 in FIG. 4), an assembly worker can tactilely assist in locating pointed end 66 through sound-deadening body 24.

Figure 5:
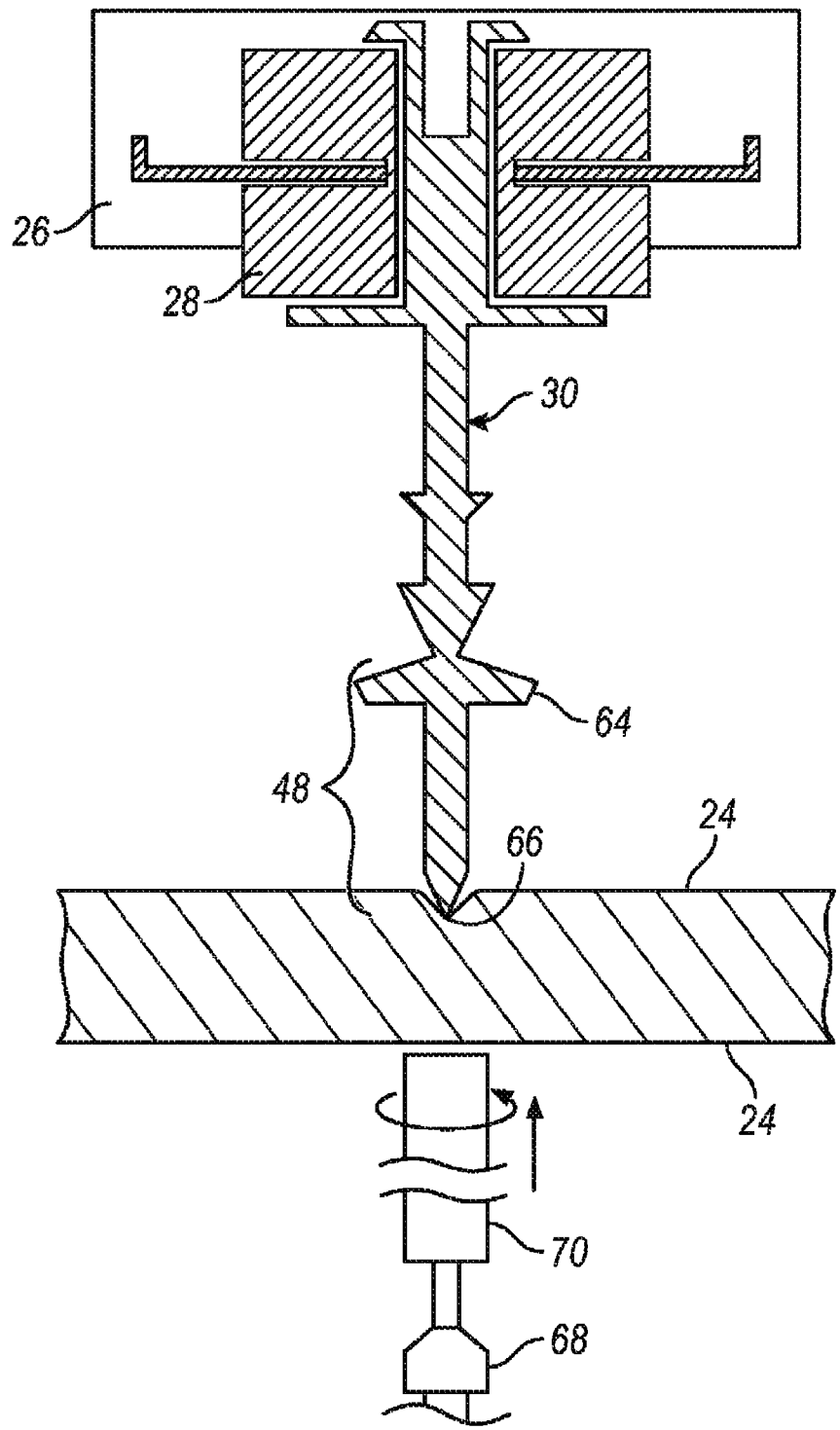
FIG. 5 is a schematic cross-sectional view illustrating the mounting sub-assembly of FIG. 4 prior to forming an opening in the sound-deadening body.

FIG. 5 illustrates a subsequent stage of assembling sound-deadening body 24 to retaining spike 30. With the location of pointed end 66 having been identified, the assembly worker may then position a drill 68 against sound-deadening body 24 in an area that corresponds with the location of pointed end 66. Drill 68 is equipped with a drill bit 70 having a generally cylindrical configuration (e.g., a tube-like configuration) and a substantially circular cross section having a diameter that is larger than a diameter of alignment spike 48 and smaller than the diameter of rear flange 64. By operating drill 68, a circular opening will be created in sound-deadening body 24 that will be large enough to permit retaining spike 30 to fit through.

Figure 6:
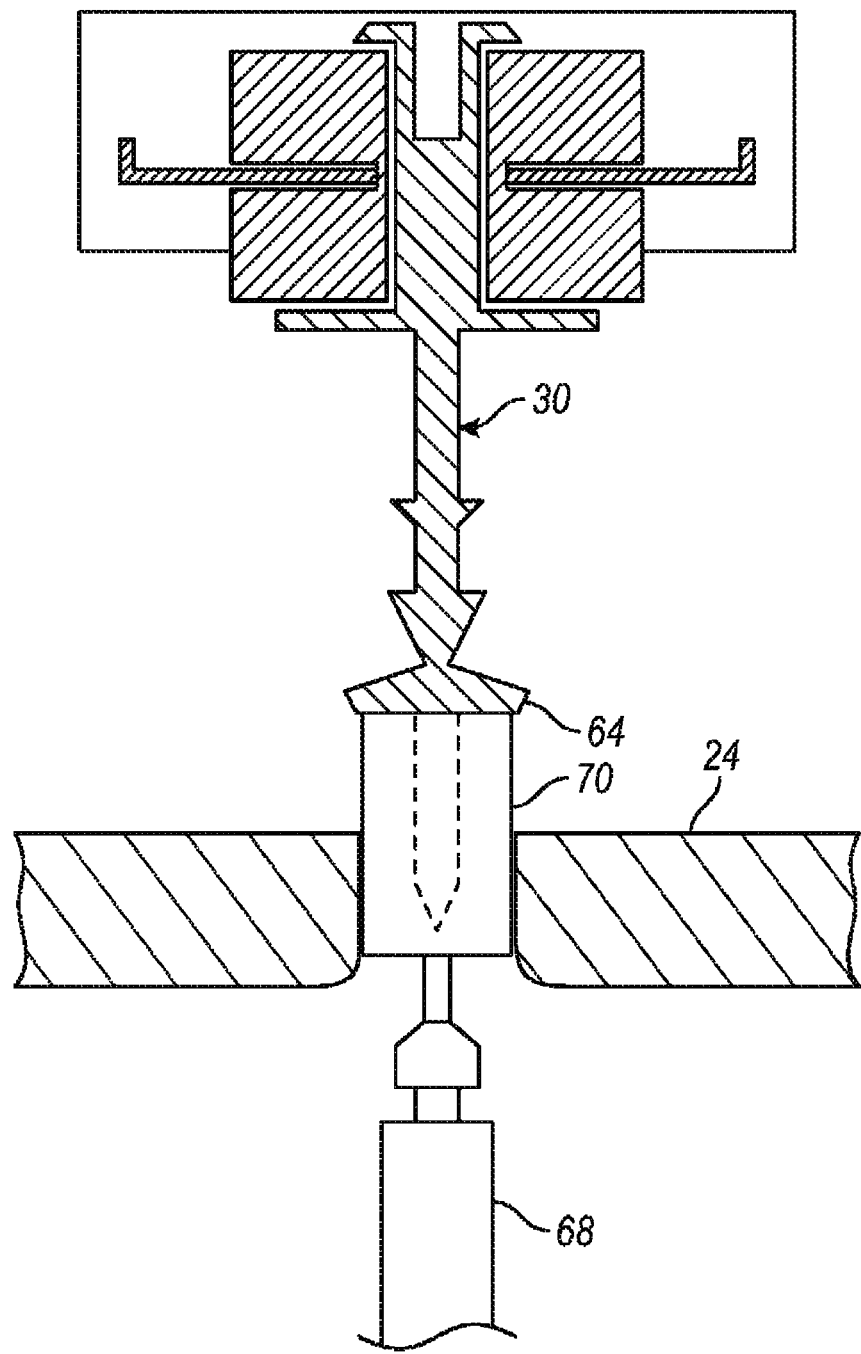
FIG. 6 is a schematic cross-sectional view illustrating the mounting sub-assembly of FIG. 5 subsequent to forming an opening in the sound-deadening body.

FIG. 6 illustrates a subsequent stage of assembling sound-deadening body 24 to retaining spike 30. With continuing reference to FIGS. 1-5, drill bit 70 has now passed entirely through sound-deadening body 24. As illustrated, because drill bit 70 has a diameter that is smaller than the diameter of rear flange 64, rear flange 64 is able to protect the remainder of retaining spike 30 from coming into contact with drill bit 70. This is advantageous because, given the fact that the assembly worker is drilling from the blind side of sound-deadening body 24, the assembly worker will likely not be able to see where alignment spike 48 ends and the remainder of retaining spike 30 begins. Contact between rear flange 64 and drill bit 70 serves to inform the assembly worker of the fact that the opening in sound-deadening body 24 has been created and that the assembly worker can cease drilling. Once drill 68 and drill bit 70 have been removed, the assembly worker may push sound-deadening body 24 past rear flange 64 and onto retaining spike 30.

Figure 7:
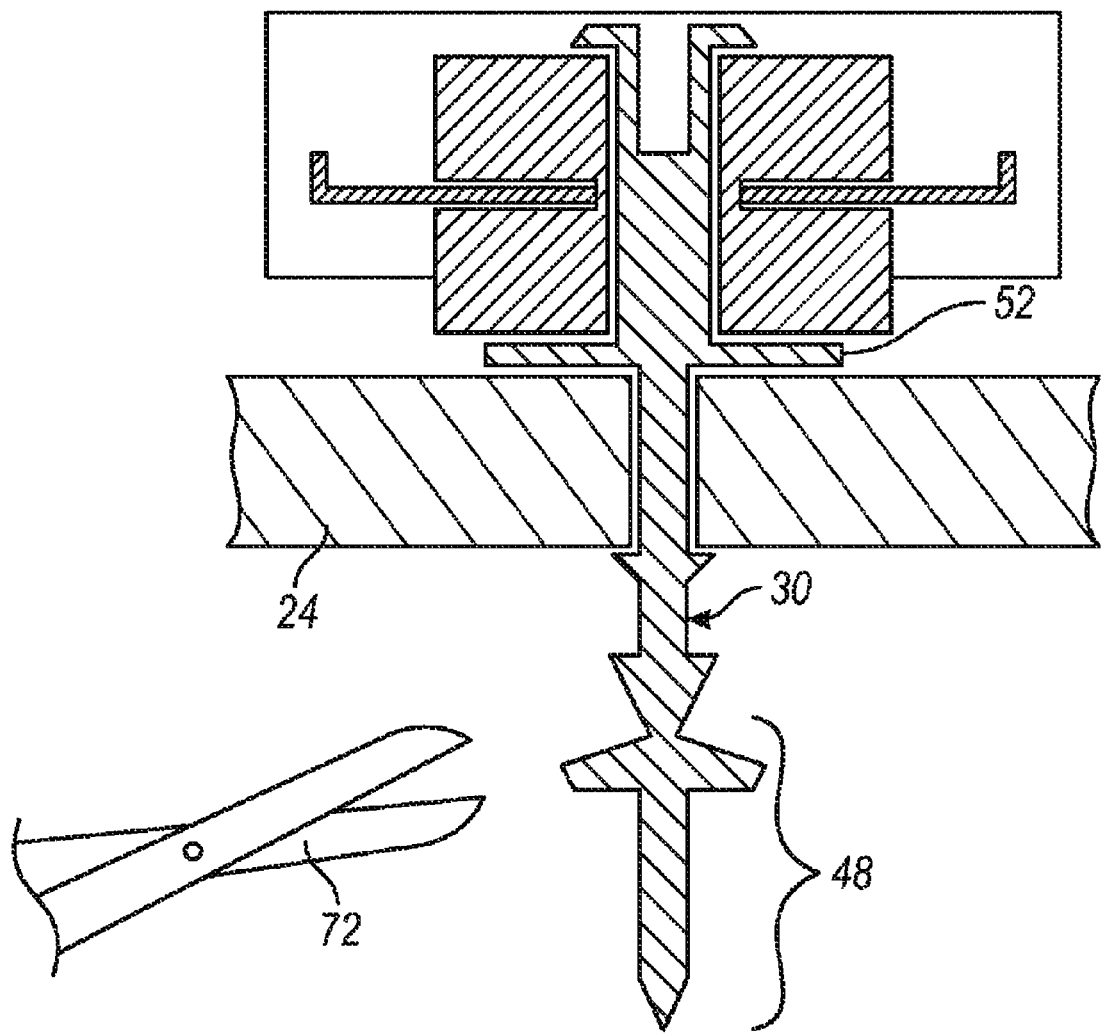
FIG. 7 is a schematic cross-sectional view illustrating the mounting sub-assembly of FIG. 6 prior to removing an alignment spike from a retaining spike.

FIG. 7 illustrates a subsequent stage of assembling sound-deadening body 24 to retaining spike 30. As illustrated, sound-deadening body 24 has been pushed onto retaining spike 30 and rests up against an under side of flange 52. With continuing reference to FIGS. 1-6, an advantage of using alignment spike 48 and drill bit 70 is the ability to produce an opening in sound-deadening body 24 having a diameter that is only slightly larger than the diameter of retaining spike 30. By having such a narrow opening, the sound-deadening nature of the insulation provided by sound-deadening body 24 is not substantially compromised as might be the case if the opening in sound-deadening body 24 left large gaps between sound-deadening body 24 and retaining spike 30. The snug fit between the retaining spike 30 and the sound-deadening body 24 prevents sound from passing directly through the hole in the sound-deadening body 24 towards the cabin.

With alignment spike 48 having served its purpose of helping to identify where to put openings in sound-deadening body 24, alignment spike 48 is no longer needed. Accordingly, alignment spike 48 may be removed. As illustrated in FIG. 7, alignment spike 48 is severed from the remainder of retaining spike 30 via the use of the pair of scissors 72. It should be understood that the use of a pair of scissor 72 is illustrative only and further that any suitable tool that is effective to remove alignment spike 48 from the reminder of retaining spike 30 may be utilized. In other embodiments, the alignment spike 48 may be snapped off from the retaining spike 30 by hand or tool.

Figure 8:
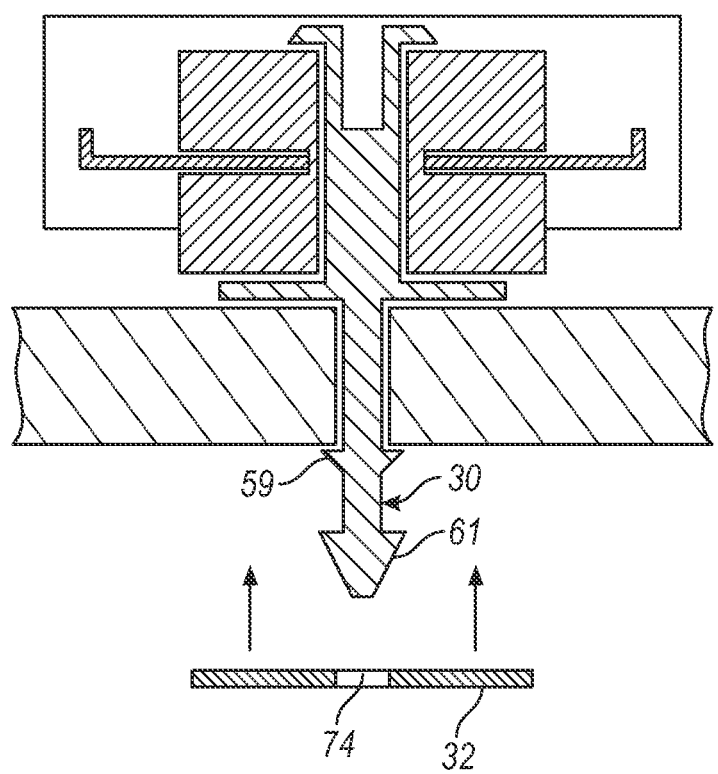
FIG. 8 is a schematic cross-sectional view illustrating the mounting sub-assembly of FIG. 7 subsequent to removal of the alignment spike and prior to attachment of a retaining plate.

FIG. 8 illustrates a final stage of assembling sound-deadening body 24 to the retaining spike 30. With continuing reference to FIGS. 1-7, alignment spike 48 has been removed from retaining spike 30 and retaining plate 32 is now being assembled to retaining spike 30. Retaining plate 32 has a generally circular configuration and defines an opening 74 that permits engagement between retaining plate 32 and retaining spike 30. Opening 74 has an inner diameter that is substantially equal to a diameter of retaining spike 30. Additionally, retaining plate 32 may be comprised of a plastic or other polymeric material that has sufficient flexibility to permit retaining plate 32 to be squeezed onto retaining spike 30 and past barb 61, or other barbs on the retaining spike 30. In other embodiments, retaining plate 32 may be made of a resilient and/or substantially rigid material that lacks substantial capacity to flex. In such embodiments, retaining spike 30 may be comprised of a flexible and/or compressible material that permits barb 59 to deflect inwardly to allow retaining plate 32 to move past barb 59.

Figure 9:
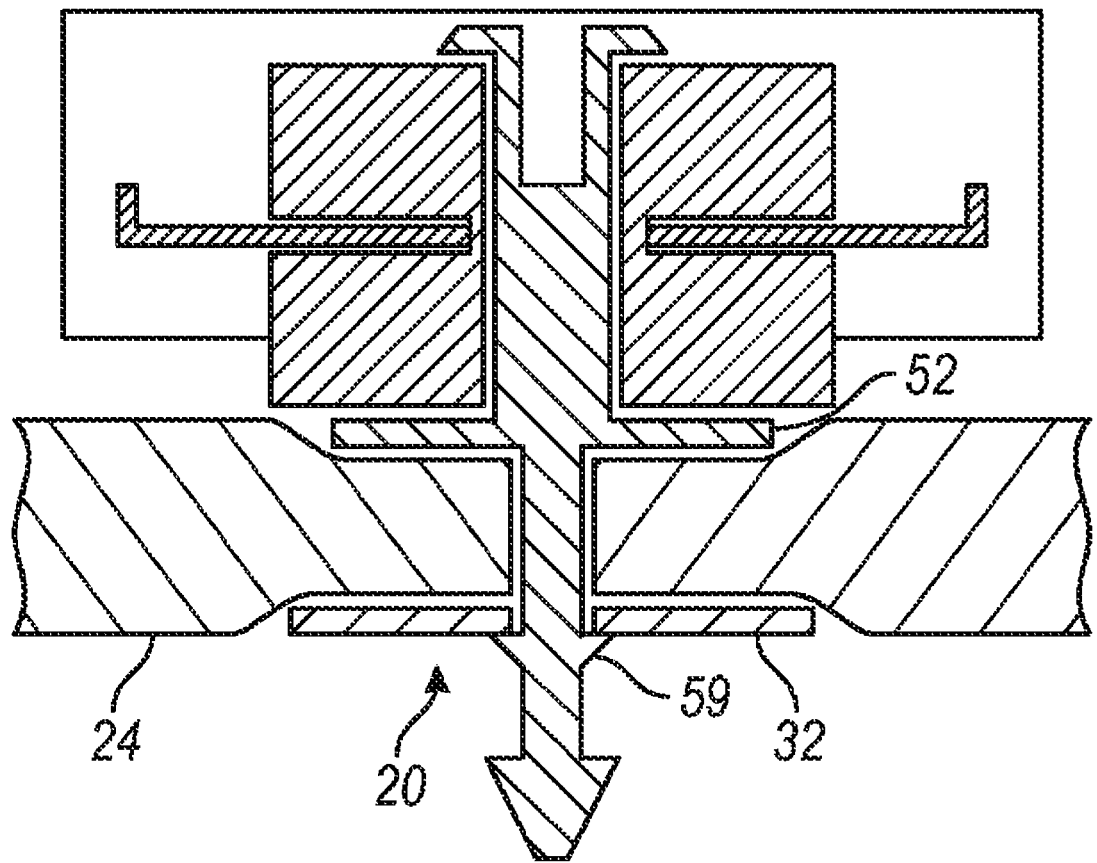
FIG. 9 is a schematic cross-sectional view illustrating the mounting assembly of FIG. 1 with a sound-deadening body assembled thereto.

FIG. 9 illustrates mounting assembly 20 engaged with sound-deadening body 24. As illustrated, retaining plate 32 and retaining spike 30 cooperate to support sound-deadening body 24. As discussed above, sound-deadening body 24 is comprised of the relatively soft and flexible material that permits a sound-deadening body 24 to deflect under compression. This is illustrated in FIG. 9 through the depiction of deformation of sound-deadening body 24 where sound-deadening body 24 is pressed up against retaining plate 32 and flange 52. This arrangement provides for a snug fit and mitigates rattling and vibration of sound-deadening body 24 once installed. In some embodiments, it may be desirable to select a sound-deadening body that has a thickness that slightly exceeds the distance between flange 52 and retaining plate 32 to ensure a pressure fitting for sound-deadening body 24.

Figure 10:
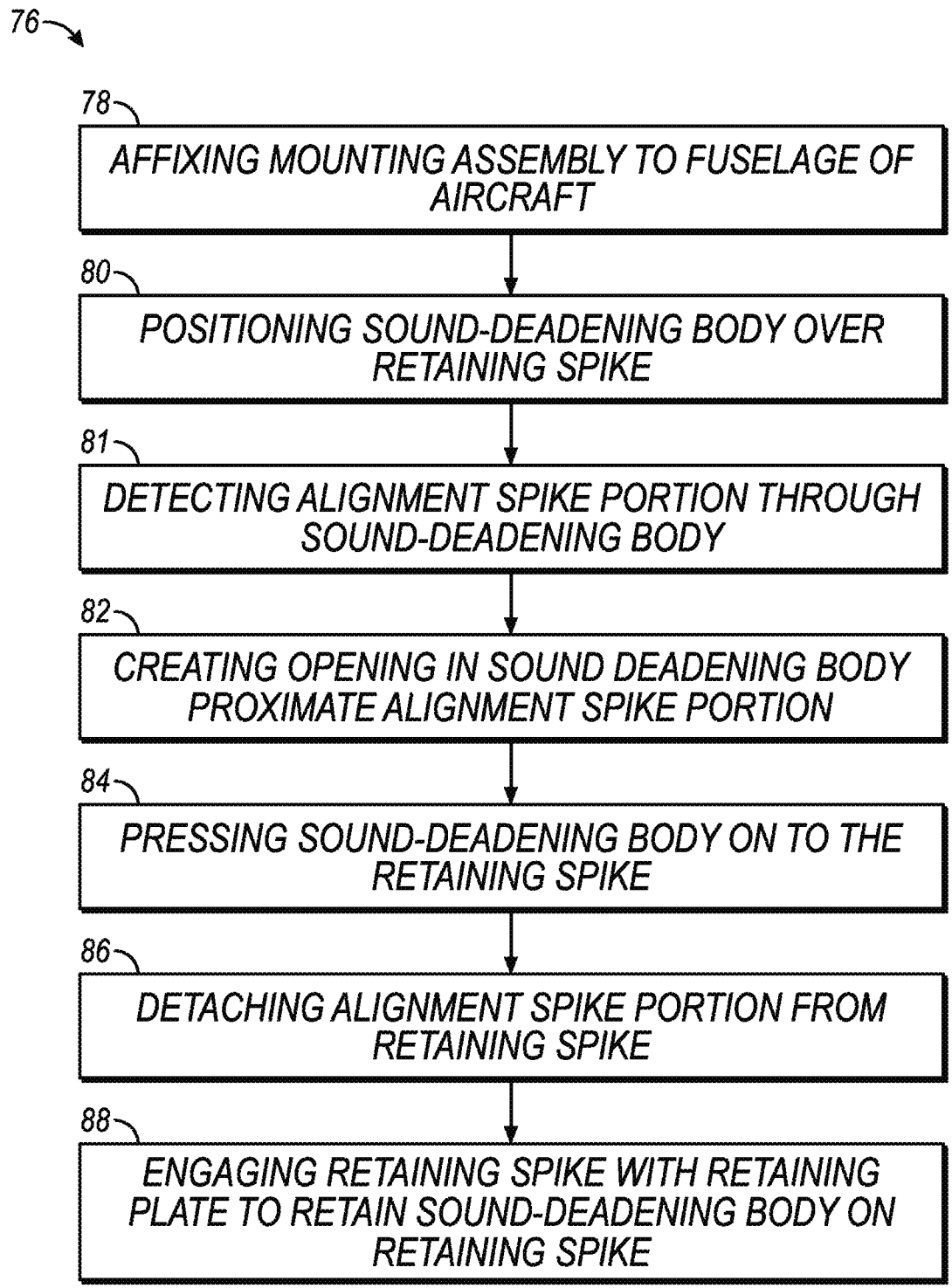
FIG. 10 is a block diagram illustrating an embodiment of a method for mounting a sound-deadening body to a fuselage of an aircraft in accordance with the teachings of the present disclosure.

FIG. 10 is a block diagram illustrating an embodiment of a method 76 for mounting a sound deadening body to a fuselage of an aircraft. At block 78, a mounting assembly is affixed to the fuselage of an aircraft. With continuing reference to FIGS. 1-9, the mounting assembly may be mounting assembly 20, discussed above. Alternatively, the mounting assembly may comprise any suitable mounting assembly having a mounting bracket, an isolating grommet that is engaged with the mounting bracket, and a retaining spike that is engaged with the isolating grommet The retaining spike includes a detachable alignment spike portion.

At block 80, a sound-deadening body is positioned over the retaining spike. The sound-deadening body may include, but not be limited to, a conventional aviation grade sound-deadening blanket as known and used in the industry. The sound-deadening body will be compressible and deformable and accordingly, an assembly worker pushing the sound-deadening body up against the retaining spike will be able to feel the pointed end of the detachable alignment spike portion from the blind side of the sound-deadening body.

At block 81, the alignment spike is detected through the sound-deadening body. As just stated, this can be accomplished by hand by feeling for the pointed end of the detachable alignment spike through the sound-deadening body.

At block 82, an opening is created in the sound-deadening body proximate the alignment spike. The opening may be made in any suitable manner. In some embodiments, the opening may be made with a drill having a cylindrical drill bit to create a relatively small circular opening as described in detail above. In other embodiments, any other suitable method for creating an opening in the sound-deadening body proximate the alignment spike portion may be utilized.

At block 84, the sound-deadening body is pressed onto the retaining spike. In some embodiments, the retaining spike may include a flange that is configured to delimit axial movement of the blanket with respect to the retaining spike.

At block 86, the alignment spike portion is removed from the retaining spike. This may be accomplished using any suitable tool including, but not limited to, a pair of scissors, knife, box cutter, shears, wire cutters, and the like. In other embodiments, the alignment spike 48 may be snapped off from the retaining spike 30 by hand or tool.

At block 88, a retaining plate is pressed over the retaining spike and engages with the retaining spike such that the retaining spike retains and supports the retaining plate. Together, the retaining plate and the retaining spike cooperate to support the sound-deadening body. In some embodiments, the step performed at block 88 may precede the step performed at block 86.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the disclosure as set forth in the appended claims.

What is claimed is:

1. A mounting assembly for mounting a sound-deadening blanket to a fuselage of an aircraft, the mounting assembly comprising:
    a mounting bracket configured for attachment to the fuselage;
    a retaining member configured to engage the sound-deadening blanket; and
    an isolating member comprising an elastomeric material, the isolating member engaged with the mounting bracket and with the retaining member in a manner such that the isolating member supports the retaining member on the mounting bracket and obstructs direct contact between the retaining member and the mounting bracket, the isolating member being at least partially elastically deformable, wherein the elastomeric material diminishes transmission of vibration from the fuselage to the retaining member when the mounting bracket is attached to the fuselage of the aircraft,
    wherein the retaining member includes a pair of spaced apart flanges configured to engage the isolating member, and
    wherein the retaining member includes a detachable alignment portion that is configured to facilitate detection of the retaining member through the sound deadening blanket.

2. The mounting assembly of claim 1, wherein the isolating member and the mounting bracket support the retaining member on the fuselage when the mounting bracket is attached to the fuselage and wherein the retaining member has no direct contact with the fuselage when the mounting bracket is attached to the fuselage.

3. The mounting assembly of claim 2, wherein the retaining member is received within an opening in the isolating member and wherein the retaining member is configured to engage the isolating member.

4. A mounting assembly for mounting a sound-deadening blanket to a fuselage of an aircraft, the mounting assembly comprising:
    a mounting bracket configured for attachment to the fuselage;
    an isolating grommet comprising an elastomeric material engaged with the mounting bracket, the isolating grommet being compressible and at least partially elastically deformable; and
    a retaining spike engaged with the isolating grommet, the retaining spike configured to engage the sound-deadening blanket and the retaining spike including a pair of spaced apart flanges configured to engage the isolating grommet,
    wherein the isolating grommet supports the retaining spike on the mounting bracket, wherein the elastomeric material diminishes transmission of vibration from the fuselage to the retaining spike when the mounting assembly is attached to the fuselage of the aircraft, and wherein the retaining spike has no direct contact with the mounting bracket.

5. The mounting assembly of claim 4, further comprising a retaining plate, wherein the retaining spike engages the retaining plate and wherein the retaining spike and the retaining plate cooperate to secure the sound-deadening blanket to the fuselage when the sound-deadening blanket is assembled to the retaining spike.

6. The mounting assembly of claim 5, wherein the retaining spike includes a barbed flange for engagement with the retaining plate.

7. The mounting assembly of claim 4, wherein the pair of spaced apart flanges are spaced apart by a distance that corresponds with an axial length of the isolating grommet.

8. The mounting assembly of claim 4, wherein the isolating grommet includes an opening extending axially through the isolating grommet, wherein the retaining spike is received within the opening, and wherein the isolating grommet is disposed between the pair of spaced apart flanges.

9. The mounting assembly of claim 8, wherein one flange of the pair of spaced apart flanges has a beveled surface to permit easy insertion of the retaining spike through the opening in the isolating grommet.

10. The mounting assembly of claim 4, wherein the retaining spike includes a detachable alignment spike portion.

11. The mounting assembly of claim 10, wherein the detachable alignment spike portion is disposed at a longitudinal end of the retaining spike.

12. The mounting assembly of claim 11, wherein the detachable alignment spike portion includes a tapered portion at a longitudinal end of the detachable alignment spike portion and a flange spaced apart from the tapered portion.

13. The mounting assembly of claim 4, wherein the mounting bracket defines an opening and wherein the isolating grommet is configured to engage the mounting bracket proximate the opening.

14. The mounting assembly of claim 13, wherein the isolating grommet includes a groove defined in a periphery of the isolating grommet and wherein the groove is configured to engage a surface of the mounting bracket forming the opening.

15. A method for attaching a sound-deadening blanket to a fuselage of an aircraft, the method comprising the steps of:
    affixing a mounting assembly to the fuselage of the aircraft, the mounting assembly having a mounting bracket, an isolating grommet comprising an elastomeric material such that the isolating grommet is compressible and at least partially elastically deformable to diminish the transmission of vibration when the mounting assembly is attached to the fuselage of the aircraft, the isolating grommet engaged with the mounting bracket, and a retaining spike engaged with the isolating grommet, the retaining spike including an alignment spike portion that is detachable and that is configured to facilitate detection of the retaining spike through the sound deadening blanket and further including a pair of spaced apart flanges configured to engage the isolating grommet;
    positioning the sound-deadening blanket over the retaining spike;
    detecting the alignment spike portion through the sound-deadening blanket;

creating an opening in the sound-deadening blanket proximate the alignment spike portion;

pressing the sound-deadening blanket onto the retaining spike;

detaching the alignment spike portion from the retaining spike; and engaging the retaining spike with a retaining plate to retain the sound-deadening blanket on the retaining spike.

16. The method of claim 15, wherein the step of creating the opening in the sound-deadening blanket comprises drilling through the sound-deadening blanket with a drill bit having a tube shaped configuration to create a circular opening in the sound-deadening blanket.

* * * * *